(12) United States Patent
Ogawa et al.

(10) Patent No.: US 10,571,875 B2
(45) Date of Patent: Feb. 25, 2020

(54) ELECTRIC VALVE CONTROL DEVICE AND ELECTRIC VALVE DEVICE INCLUDING THE SAME

(71) Applicant: FUJIKOKI CORPORATION, Tokyo (JP)

(72) Inventors: Yoshio Ogawa, Tokyo (JP); Akihiro Hayashi, Tokyo (JP); Kiyoharu Satou, Tokyo (JP)

(73) Assignee: FUJIKOKI CORPORATION, Tokyo (JP)

(*) Notice: Subject to any disclaimer, the term of this patent is extended or adjusted under 35 U.S.C. 154(b) by 114 days.

(21) Appl. No.: 15/794,120

(22) Filed: Oct. 26, 2017

(65) Prior Publication Data

US 2018/0120795 A1   May 3, 2018

(30) Foreign Application Priority Data

Oct. 31, 2016   (JP) ................................. 2016-212505

(51) Int. Cl.
   *G05B 15/02*       (2006.01)
   *F16K 31/02*       (2006.01)
   (Continued)

(52) U.S. Cl.
   CPC .............. *G05B 15/02* (2013.01); *F16K 31/00* (2013.01); *F16K 31/02* (2013.01);
   (Continued)

(58) Field of Classification Search
   CPC ....... G05B 15/02; F24F 11/37; G05D 16/202; F16K 31/02; F16K 37/0083; F16K 31/00
   See application file for complete search history.

(56) References Cited

U.S. PATENT DOCUMENTS

| | | | |
|---|---|---|---|
| 7,762,094 B2* | 7/2010 | Iwaki | F25B 41/062 251/129.05 |
| 2006/0213208 A1* | 9/2006 | Iwaki | F25B 41/062 62/222 |

(Continued)

FOREIGN PATENT DOCUMENTS

| | | |
|---|---|---|
| JP | H9-243137 A | 9/1997 |
| JP | 2000-356278 A | 12/2000 |

(Continued)

OTHER PUBLICATIONS

Extended European Search Report in corresponding European Application No. EP 17199073.2, dated Feb. 13 2018.

*Primary Examiner* — Charles R Kasenge
(74) *Attorney, Agent, or Firm* — Bacon & Thomas, PLLC

(57) ABSTRACT

To provide an electric valve control device capable of preventing a delay at the time of starting a control of an electric valve by shortening a standby time of an air conditioner or the like when power is input again or a sleep mode is cancelled and an electric valve device including the same. After receiving a power-off signal predicting a power-off operation of an electric valve 9 or a sleep transition signal predicting a sleep mode transition operation thereof from an outside, (current) valve opening degree information at the time of stopping an operation of the electric valve 9 is stored in an EEPROM (a nonvolatile storage unit) 11c. At the time of inputting power again or cancelling a sleep mode, the current (immediately precedent) valve opening degree information stored in the EEPROM 11c is read from the EEPROM 11c to resume a control of the electric valve 9.

6 Claims, 4 Drawing Sheets

(51) Int. Cl.
*F16K 37/00* (2006.01)
*F24F 11/37* (2018.01)
*F16K 31/00* (2006.01)
*G05D 16/20* (2006.01)

(52) U.S. Cl.
CPC .......... *F16K 37/0083* (2013.01); *F24F 11/37* (2018.01); *G05D 16/202* (2013.01)

(56) References Cited

U.S. PATENT DOCUMENTS

| | | | | |
|---|---|---|---|---|
| 2010/0032492 | A1* | 2/2010 | Grimm | A01M 7/0089 239/1 |
| 2011/0252875 | A1* | 10/2011 | Grossmann | F02D 9/10 73/114.31 |
| 2012/0271467 | A1* | 10/2012 | Grimm | A01M 7/0089 700/283 |
| 2018/0087687 | A1* | 3/2018 | Ogawa | F25B 41/062 |

FOREIGN PATENT DOCUMENTS

| | | |
|---|---|---|
| JP | 2009-068744 A | 4/2009 |
| JP | 2011-144951 A | 7/2011 |

* cited by examiner

ELECTRIC VALVE CONTROL DEVICE AND ELECTRIC VALVE DEVICE INCLUDING THE SAME

TECHNICAL FIELD

The present invention relates to an electric valve control device and an electric valve device including the same and particularly to an electric valve control device capable of promptly resuming a control at the time of inputting power again and an electric valve device including the same.

BACKGROUND ART

Conventionally, there is known an electric valve used in a refrigeration cycle such as a room air conditioner, a car air conditioner, a freezing/refrigerating device, and a chiller, decreasing a pressure of a high-pressure refrigerant liquid, sending a refrigerant to a low-pressure evaporator, and adjusting a flow rate of the refrigerant (for example, an electric valve controlling a valve opening degree by driving a valve body using a stepping motor) (for example, see the following Patent Document 1).

Among these electric valves, for example, in an electric valve or the like which is controlled by an open loop and cannot detect an absolute position (an actual position) without using a position detection element or the like, a current valve opening degree at the time of starting a control, for example, when power is input or a sleep mode is cancelled cannot be clearly found. For this reason, in some cases, there is a need to perform an operation called an "initializing operation (also referred to as a base point positioning or a home position positioning)" of performing a valve closing operation or/and a valve opening operation at a control pulse range (for example, 500 pulses) or more (for example, 700 pulses or more) and setting that position as a control reference position. Further, since the initializing operation is performed at the control pulse range or more for the additional tightening operation, for example, in an electric valve of which a control range is 0 to 500 pulses and an excitation speed is 80 pps (a speed of 80 pulses for one second), a time equal to or longer than 700÷80=8.75 seconds is needed.

CITATION LIST

Patent Document

Patent Document 1: JP 2000-356278 A

SUMMARY OF THE INVENTION

Problem to be Solved by the Invention

In such an electric valve, when the power is interrupted or the sleep mode is set suddenly, the current position of the valve opening degree is not clearly found as described above. For this reason, there is a need to know the reference position by performing the above-described initializing operation at the time of inputting the power again or cancelling the sleep mode. As a result, since some time is taken until a general operation is performed, a problem arises in that an operation of starting an air conditioner is delayed. Further, another problem arises in that extra energy is consumed due to the initializing operation. Further, the valve closing operation or/and the valve opening operation or the additional tightening operation is necessary for each initializing operation. Accordingly, since the electric valve is a mechanical component and the mechanical operation lifetime is limited, a problem arises in the lifetime of the electric valve is also shortened when the initializing operation is frequently performed (the number of times of operating the valve increases).

The invention has been made in view of the above-described circumstances and an object of the invention is to provide an electric valve control device capable of preventing a delay at the time of starting a control of an electric valve by shortening a standby time of an air conditioner or the like when power is input again or a sleep mode is cancelled and an electric valve device including the same.

Means for Solving Problem

In order to solve the above-described problems, an electric valve control device according to the invention is an electric valve control device controlling a valve opening degree of an electric valve by receiving power from an outside, in which a nonvolatile storage unit stores valve opening degree information at the time of stopping an operation of the electric valve after a power-off signal predicting a power-off operation of the electric valve or a sleep transition signal predicting a sleep mode transition operation is transmitted from the outside to the electric valve control device.

In a desirable aspect, when the electric valve control device stores the valve opening degree information in the nonvolatile storage unit, the electric valve control device transmits a power-off enable signal notifying a power-off enable state or a sleep transition enable signal notifying a sleep mode transition enable state to the outside.

In another desirable aspect, the electric valve control device stores the number of times of storing the valve opening degree information in the nonvolatile storage unit along with the valve opening degree information.

In a further desirable aspect, when the electric valve control device stores the valve opening degree information and the number of times of storing the valve opening degree information in the nonvolatile storage unit, the electric valve control device transmits a power-off enable signal notifying a power-off enable state or a sleep transition enable signal notifying a sleep mode transition enable state to the outside.

In a further desirable aspect, the electric valve control device transmits a notification signal notifying a current state to the outside when the number of times of storing the valve opening degree information is larger or is equal to or larger than a predetermined number of times of storing the valve opening degree information.

In another desirable aspect, the electric valve control device resumes the control of the electric valve on the basis of the valve opening degree information stored in the nonvolatile storage unit when the power is input again or the sleep mode is cancelled.

In a still further desirable aspect, the electric valve control device receives the power-off signal, receives the sleep transition signal, transmits the power-off enable signal, and transmits the sleep transition enable signal by a LIN communication or a CAN communication.

Further, an electric valve device according to the invention is obtained by integrally assembling the electric valve control device and the electric valve.

Further, an electric valve control device according to the invention is an electric valve control device controlling a valve opening degree of an electric valve, in which the nonvolatile storage unit stores the valve opening degree information of the electric valve before the power-off operation or the sleep mode transition operation of the electric valve.

Effect of the Invention

According to the invention, since the nonvolatile storage unit stores the (current) valve opening degree information at the time of stopping the operation of the electric valve after receiving the sleep transition signal predicting the sleep mode transition operation or the power-off signal predicting the power-off operation of the electric valve before the actual power-off operation or the actual sleep mode transition operation, the power-off operation or the sleep mode transition operation can be performed after the valve opening degree information is reliably stored. For that reason, it is possible to prevent a problem in which the power-off operation or the sleep mode transition operation is suddenly performed so that the current position is not known.

Further, since the control of the electric valve is resumed by reading the current valve opening degree information stored in the nonvolatile storage unit from the nonvolatile storage unit at the time of inputting the power again or cancelling the sleep mode, the initializing operation is not necessary and the operation can be immediately started. For this reason, it is possible to speed up the operation of the host system such as the air conditioner. Further, since the energy consumed by the initializing operation can be also reduced, fuel efficiency can be improved in the case of, for example, a car air conditioner or the like. Further, since the valve closing operation or/and the valve opening operation or the additional tightening operation due to the initializing operation can be also omitted, the operation lifetime of the electric valve is also extended.

Further, since the storage unit stores the valve opening degree information and the notification signal is transmitted to the outside when the number of times of storing data is larger or is equal to or larger than a predetermined number of times of storing data, the external device that receives the signal can manage, for example, the replacement timing of the electric valve control device by determining the information (signal).

Further, since the LIN communication or CAN communication is used, the car air conditioner or the like can use the existing signal transmitting and receiving line of the in-vehicle LAN system. For this reason, there is no need to attach a new signal line. Alternatively, since the electric valve device is assembled by integrating the electric valve control device and the electric valve, the electric valve device can be decreased in size.

MODE(S) FOR CARRYING OUT THE INVENTION

Hereinafter, an embodiment of the invention will be described with reference to the drawings.

Figure 1:
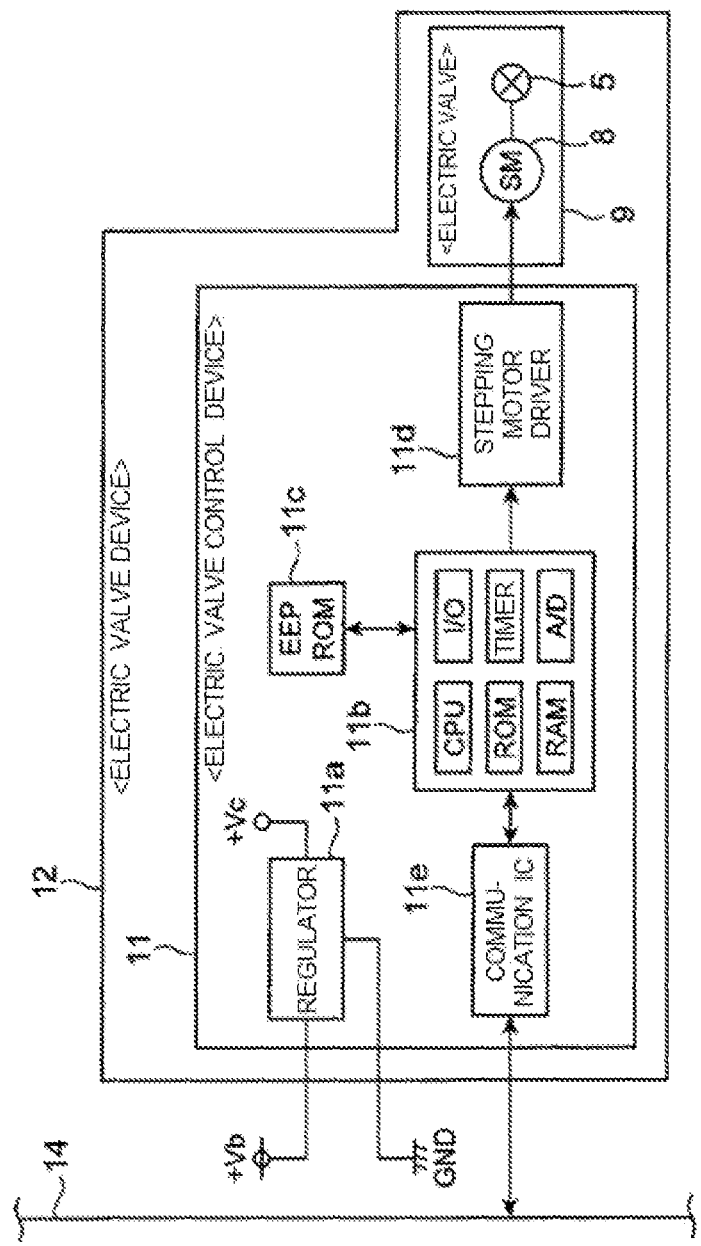
FIG. 1 is a system block diagram illustrating an electric valve control device according to the invention and an electric valve device including the same.

FIG. 1 is a system block diagram illustrating an electric valve control device according to the invention and an electric valve device including the same. Further, in the description below, an exemplary case in which the electric valve control device according to the invention is applied to an expansion valve for controlling a flow rate of a refrigeration cycle system used in a car air conditioner will be described.

An electric valve device 12 according to the embodiment illustrated in the drawings has a configuration in which an electric valve 9 and an electric valve control device 11 are integrally assembled in a casing (not illustrated), and the electric valve 9 includes an expansion valve 5 having a valve body (not illustrated) for controlling a flow rate of a fluid (a refrigerant) and a stepping motor 8 driving the valve body of the expansion valve 5. Here, the valve opening degree of the expansion valve 5 (the electric valve 9) is adjusted by the rotation of the stepping motor 8.

Although not illustrated in the drawings, for example, in a refrigeration cycle system used in a car air conditioner, a compressor, a condenser, (the expansion valve 5 of) the electric valve 9, and an evaporator are sequentially connected through a pipe and a flow rate of a refrigerant flowing through the pipe is controlled when the valve opening degree of (the expansion valve 5 of) the electric valve 9 is adjusted.

Power (+Vb, GND) is connected to the electric valve control device 11 and a signal transmitting and receiving line 14 for signals generated from an externally connected device (which is, for example, an external device such as a system control device and will be simply referred to as the outside) is connected thereto. The electric valve control device 11 controls the opening degree (the valve opening degree) of the electric valve 9 (the expansion valve 5) by receiving an instruction such as an initializing signal or the number of pulses of the stepping motor 8 using signals from the external device (for example, the system control device) connected to the signal transmitting and receiving line 14.

For transmitting and receiving signals to and from the outside, for example, signals may be transmitted and received to and from a serial interface by a communication (a LIN communication, a CAN communication, etc.), signals may be transmitted to an A/D converter using analog signals (signals of DC 4 to 20 mA, signals of DC 0 to 5 V, etc.), signals may be transmitted and received to and from an I/O port using digital signals (ON-OFF signals, etc.), and signals may be transmitted and received wirelessly (Wi-Fi (registered trademark), Bluetooth (registered trademark) etc.), and the like. However, the invention is not particularly limited, but any method may be used. In FIG. 1, a LIN communication which is used in an in-vehicle LAN normally used for a car air conditioner and the like is employed. For that reason, a power-off signal receiving operation, a sleep transition signal receiving operation, a power-off enable signal transmitting operation, and a sleep transition enable signal transmitting operation used in the control of the electric valve control device 11 are performed by the LIN communication. When the LIN communication or CAN communication corresponding to the existing in-vehicle LAN is used, there is no need to attach a new signal transmitting and receiving line.

The electric valve control device 11 basically has a configuration in which a regulator 11a generating power +Vc from the power +Vb by using an internal circuit of the electric valve control device 11, a microcomputer 11b including a ROM storing a program for controlling the rotation of the stepping motor 8, a CPU executing a calculation process or executing the program stored in the ROM, a RAM temporarily storing data necessary for executing a program such as a state of an initializing operation, an I/O circuit transmitting and receiving signals to and from a peripheral circuit, a timer measuring a time of an interruption process, and an A/D converter converting an analog signal into a digital signal, a stepping motor driver 11*d* controlling the rotation of the stepping motor 8 of the electric valve 9 on the basis of a driving signal from the microcomputer 11*b*, an EEPROM 11*c* connected to the microcomputer 11*b* and serving as a nonvolatile storage unit storing data (for example, valve opening degree information relating to a current valve opening degree of the electric valve 9 or the number of times of storing the valve opening degree information) which needs to be stored even in a power-off state or a sleep mode transition state among the RAM data of the microcomputer 11*b*, and a communication IC 11*e* (for example, a LIN transceiver or the like) connected between the signal transmitting and receiving line 14 and the microcomputer 11*b* and converting voltage levels of transmitted and received signals are mounted on, for example, a substrate (not illustrated).

Additionally, a detailed configuration of the electric valve control device 11 is not limited to the above-described configuration, and any configuration may be employed as long as the invention can be embodied. For example, two or more components of FIG. 1 may be configured as one chip IC.

In this embodiment, the microcomputer 11*b* generally controls the valve opening degree of the electric valve 9 (the expansion valve 5) on the basis of the control signal transmitted from the external device (for example the system control device) via the signal transmitting and receiving line 14. However, when the microcomputer receives a power-off signal predicting a power-off operation or a sleep transition signal predicting a sleep mode transition operation from the external device, for example, the operation of the electric valve 9 (the expansion valve 5) in operation is stopped and the (current) valve opening degree information of the electric valve 9 at that time is stored in the EEPROM 11*c*. Further, the microcomputer 11*b* also stores the number of times of storing the valve opening degree information in the EEPROM 11*c* in the EEPROM 11*c* along with the valve opening degree information.

Here, the valve opening degree information is information relating to the valve opening degree of the electric valve 9 and includes, for example, information such as the rotation position of the stepping motor 8, the number of pulses, and the position of the valve body of the expansion valve 5 (the electric valve 9).

A method of storing the valve opening degree of the electric valve 9 in the EEPROM 11*c* whenever changing the valve opening degree can be considered, but since the number of times of storing data is generally limited in the EEPROM 11*c*, the number of times of storing data in the EEPROM 11*c* corresponding to the nonvolatile storage unit is limited by limiting the storage chance only for a case in which the power-off signal or the sleep transition signal is transmitted from the outside in this embodiment.

Further, the microcomputer 11*b* compares the number of times of storing data in the EEPROM 11*c* with a predetermined number of times of storing data (the limited number of times of storing data defined in the nonvolatile storage unit like the EEPROM 11*c*). Then, when the number of times of storing data is larger than the predetermined number of times of storing data or is equal to or larger than the predetermined number of times of storing data, a notification signal notifying a current state is transmitted to the external device.

When the power-off operation or the sleep mode transition operation is ready, that is, the valve opening degree information and the number of times of storing data is stored in the EEPROM 11*c* or the transmission of the notification signal to the external device is checked, the power-off enable signal notifying the power-off enable state or the sleep transition enable signal notifying the sleep mode transition enable state is transmitted to the external device.

The external device interrupts the power of the electric valve control device 11 after receiving the power-off enable signal or the sleep transition enable signal from the electric valve control device 11 via the signal transmitting and receiving line 14.

When power is input again via the external device or the sleep mode is cancelled, the microcomputer 11*b* reads the valve opening degree (information) of the electric valve 9 stored before the sleep mode transition operation or the power-off operation from the EEPROM 11*c* and resumes a general control by using the valve opening degree as the current valve opening degree.

Accordingly, since the power-off operation or the sleep mode transition operation is not performed until the current valve opening degree information is completely stored in the EEPROM 11*c*, the current valve opening degree information can be reliably stored in the EEPROM 11*c* and the number of times of storing data in the EEPROM 11*c* corresponding to the nonvolatile storage unit can be limited. Also, an excessive initializing operation of the electric valve 9 can be omitted when the power is input again or the sleep mode is cancelled.

<Power-Off Control>

Figure 2:
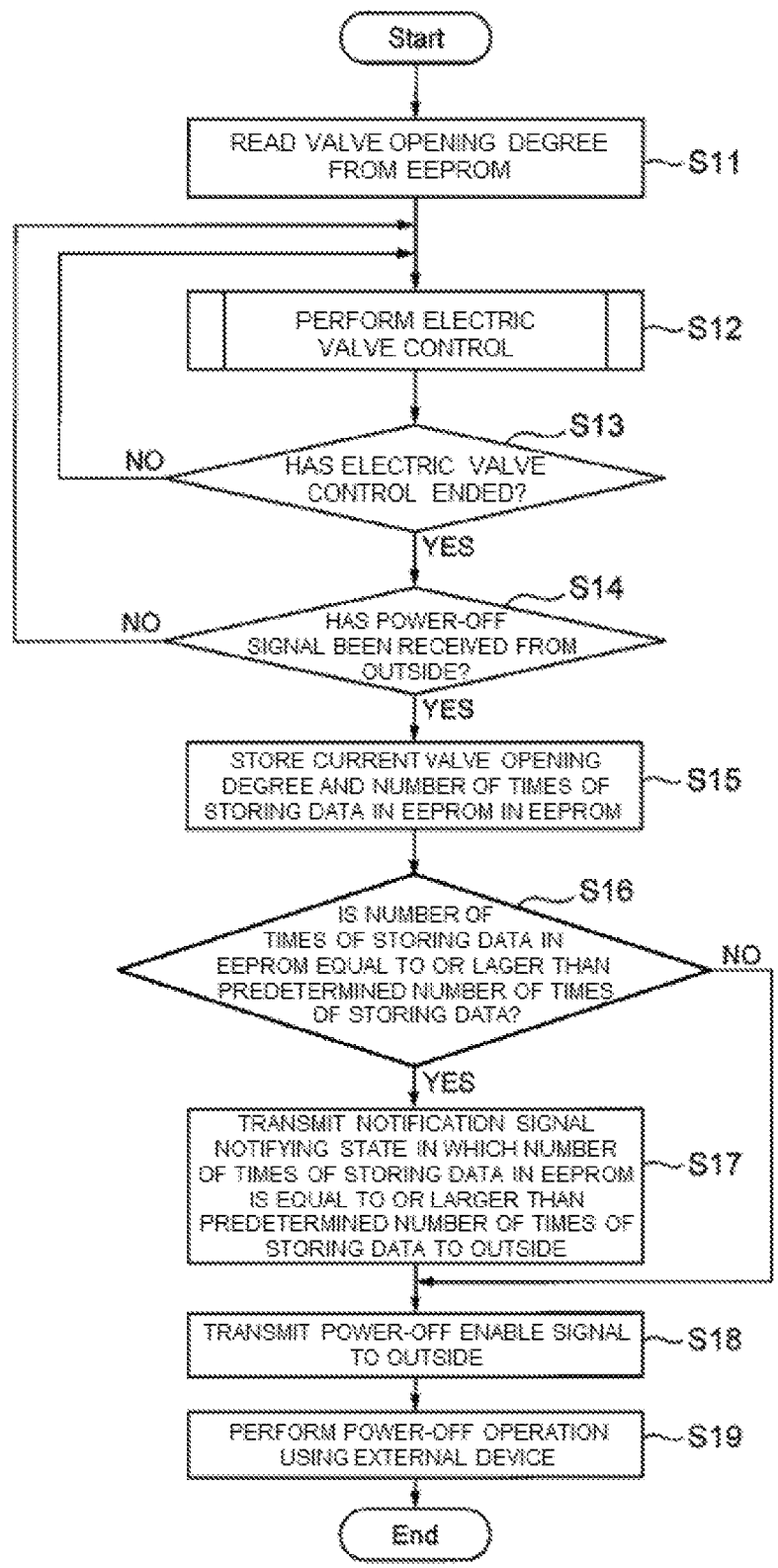
FIG. 2 is a flowchart illustrating a process flow of a power-off control using the electric valve control device illustrated in FIG. 1.

FIG. 2 is a flowchart illustrating a process flow of the power-off control using (the microcomputer 11*b* of) the electric valve control device 11 illustrated in FIG. 1.

When power is input via the external device, the microcomputer 11*b* reads the valve opening degree (information) of the electric valve 9 stored before the power-off operation from the EEPROM 11*c* (step S11) and performs a general control by using the valve opening degree as the current valve opening degree (step S12 and step S13).

Figure 3:
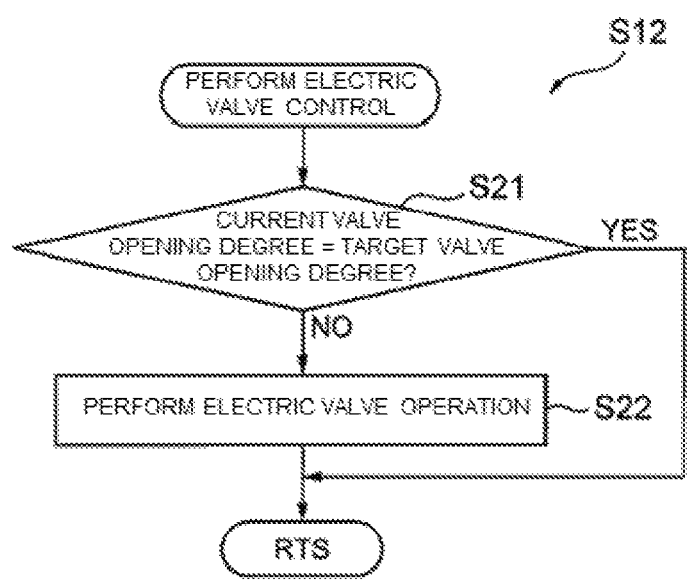
FIG. 3 is a flowchart illustrating a process flow of the electric valve control illustrated in FIG. 2.

In this general electric valve control, as illustrated in FIG. 3, the target valve opening degree transmitted from the external device via the signal transmitting and receiving line 14 is compared with the current valve opening degree (step S21). When both valve opening degrees are different from each other (step S21: No), the electric valve 9 is operated to adjust the valve opening degree of the electric valve 9 (step S22).

Further, the microcomputer 11*b* periodically determines whether the power-off signal is transmitted from the outside (step S14). When the power-off signal is transmitted before the interruption of power (step S14: Yes), the current valve opening degree of the electric valve 9 and the number of times of storing data in the EEPROM (the number of times of storing the valve opening degree in the EEPROM 11*c*) are stored in the EEPROM 11*c* (step S15). Further, the microcomputer determines whether the number of times of storing data in the EEPROM 11*c* is a predetermined number of times of storing data (step S16). When the number of times of storing data in the EEPROM 11*c* is equal to or larger than the predetermined number of times of storing data (step S16: Yes), the notification signal notifying this state is transmitted to the outside (step S17).

When the power-off operation is ready, the microcomputer 11b transmits the power-off enable signal notifying the power-off enable state (in other words, the power-off allowing state) to the outside (step S18).

Then, the power of the electric valve control device 11 is interrupted by the external device that receives the power-off enable signal from the microcomputer 11b (step S19).

Additionally, the microcomputer 11b repeats the processes in step S11 to step S19 when the power is input via the external device.

In this way, according to the electric valve control device 11 of this embodiment, since the power-off operation is performed after storing the (current) valve opening degree information in the EEPROM (the nonvolatile storage unit) 11c in the state of stopping the operation of the electric valve 9 in response to the transmission of the power-off signal predicting the interruption of the power of the electric valve 9 from the outside before the actual power-off operation, the current valve opening degree information can be reliably stored in the EEPROM 11c. Accordingly, it is possible to prevent a problem in which the current position cannot be found due to the sudden interruption of power. Further, since the chance of storing the valve opening degree information in the EEPROM 11c is limited only to a case in which the power-off signal is transmitted from the outside, the number of times of storing data in the EEPROM 11c can be decreased and thus the lifetime of the electric valve control device 11 can be extended.

Further, since the control of the electric valve 9 is resumed by reading the current (immediately precedent) valve opening degree information stored in the EEPROM 11c at the time of inputting power again, the initializing operation is not necessary and the operation can be immediately started. For this reason, it is possible to speed up the operation of the host system such as the air conditioner. Further, since the energy consumed by the initializing operation can be also reduced, the fuel efficiency can be improved, for example, in the case of the car air conditioner or the like. Further, since the valve closing operation or/and the valve opening operation performed during the initializing operation or the additional tightening operation can be also omitted, the operation lifetime of the electric valve 9 is also extended.

Further, since the notification signal is transmitted to the outside when the number of times of storing the valve opening degree information in the EEPROM 11c is larger than or equal to or larger a predetermined number of times of storing data, the external device that receives the signal can manage, for example, the replacement timing of the electric valve control device 11 by determining the information (signal).

<Sleep Mode Transition Control>

In the description of the above-described embodiment, the power-off control using the electric valve control device has been described, but a case in which the invention is applied to a sleep mode transition control using the electric valve control device will be described below. In addition, the same reference numerals will be given to the same components as those of the above-described embodiment relating to the power-off control and a description thereof will be omitted.

Here, the sleep mode indicates a mode in which the function of the microcomputer 11b is limited or partially stopped to save power although power is input thereto. When it becomes the sleep mode, there is a case in which the current position of the valve opening degree cannot be found. For example, when a period in which data is not transmitted and received is changed to the sleep mode and the sleep mode is cancelled at the time of detecting the transmission of data, power can be saved.

Figure 4:
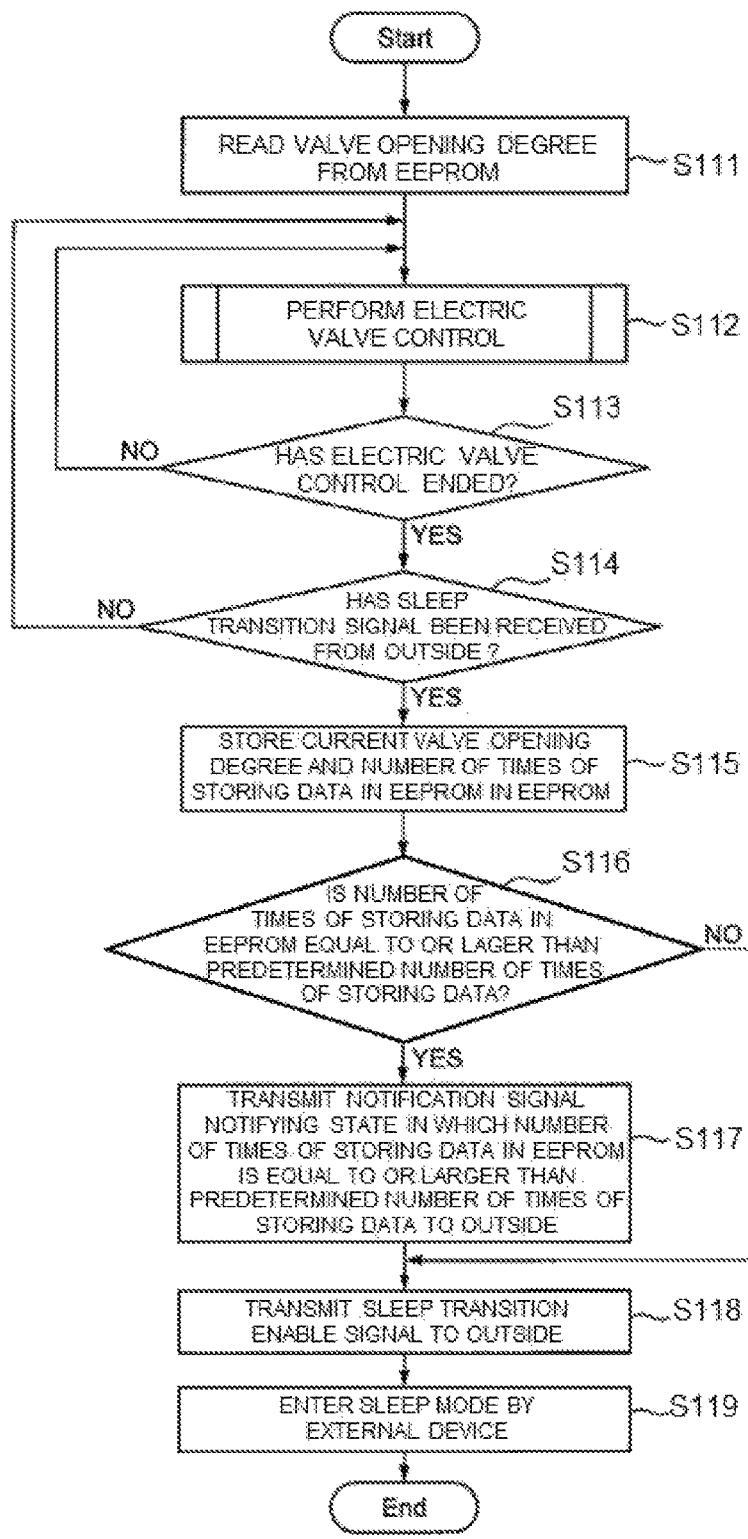
FIG. 4 is a flowchart illustrating a process flow of a sleep mode transition control using the electric valve control device illustrated in FIG. 1.

FIG. 4 is a flowchart illustrating a process flow of the sleep mode transition control using (the microcomputer 11b of) the electric valve control device 11.

When power is input via the external device and the sleep mode is cancelled, the microcomputer 11b reads the valve opening degree (information) of the electric valve 9 stored before the power-off operation or the sleep mode transition operation from the EEPROM 11c (step S111) and performs a general control by using the valve opening degree as the current valve opening degree (step S112 and step S113). In the general electric valve control, the valve opening degree of the electric valve 9 is adjusted (step S21 and step S22 of FIG. 3).

Further, when the microcomputer 11b receives the sleep transition signal (step S114: Yes), the current valve opening degree of the electric valve 9 and the number of times of storing data in the EEPROM (the number of times of storing the valve opening degree in the EEPROM 11c) are stored in the EEPROM 11c (step S115). Further, the microcomputer determines whether the number of times of storing data in the EEPROM 11c is equal to or larger than a predetermined number of times of storing data (step S116). When the number of times of storing data is equal to or larger than the predetermined number of times of storing data (step S116: Yes), a notification signal notifying this state is transmitted to the outside (step S117).

When the sleep mode transition operation is ready, the microcomputer 11b transmits the sleep transition enable signal notifying the sleep mode transition enable state (in other words, the sleep mode allowing state) to the outside (step S118). Then, the electric valve control device 11 enters the sleep mode by the external device which receives the sleep transition enable signal from the microcomputer 11b (step S119).

Additionally, when the sleep mode is cancelled via the external device, the microcomputer 11b reads the valve opening degree (information) of the electric valve 9 stored before the sleep mode transition operation from the EEPROM 11c, resumes the general control by using the valve opening degree as the current valve opening degree, and repeats the processes from step S111 to S119.

In this way, when the control of the electric valve control device 11 is applied to the sleep mode transition operation, the sleep mode transition operation is performed by storing the current valve opening degree information of the electric valve 9 in the EEPROM (the nonvolatile storage unit) 11c after receiving the sleep mode transition signal predicting the sleep mode transition operation of the electric valve 9 from the outside before the sleep mode transition operation. Accordingly, since the current valve opening degree information can be reliably stored in the EEPROM 11c similarly to the case of the application to the power-off control, there is no need to perform the initializing operation in order to read the current position from the EEPROM 11c at the time of cancelling the sleep mode. Further, since the chance of storing the valve opening degree information in the EEPROM 11c is limited only to a case in which the sleep transition signal is transmitted from the outside, the number of times of storing data in the EEPROM 11c can be decreased. That is, even when the control of the electric valve control device 11 is applied to the sleep mode transition operation, the same effect as that of the power-off control can be obtained. Further, the sleep mode transition control can be, of course, applied in this way in the device in which the electric valve control device 11 can be applied to the power-off control. In addition, the electric valve control device 11 may perform both the power-off control and the sleep mode transition control.

Additionally, even when the microcomputer receives the sleep signal notifying the sleep mode transition operation in addition to the sleep transition signal predicting the sleep mode transition operation (for example, when a Go-to-Sleep signal in the LIN communication is received or a bus idle state is continued for 4 seconds or more), information such as the valve opening degree of the electric valve 9 before the sleep mode transition operation may be stored in the EEPROM 11c. In this case, since the electric valve control device 11 enters the sleep mode after storing the current valve opening degree information or the number of times of storing data in the EEPROM in the EEPROM 11c, there is no need to receive the sleep transition signal or transmit the sleep transition enable signal and there is no need to perform the initializing operation in order to read the current position from the EEPROM 11c at the time of cancelling the sleep mode. In this way, the same effect can be, of course, obtained even when the control of the electric valve control device 11 is applied to the sleep mode transition operation. Further, when the electric valve control device 11 knows the power-off state in advance, there is no need to receive the power-off signal or transmit the power-off enable signal. Further, since the EEPROM 11c stores the current valve opening degree information or the number of times of storing data in the EEPROM before the power-off operation, it is possible to read the current position from the EEPROM 11c at the time of inputting power again. Accordingly, it is needless to say that the same effect can be obtained.

Additionally, in the above-described embodiment, a case in which the electric valve control device 11 and the electric valve device 12 are applied to the expansion valve 5 (the electric valve 9) of the refrigeration cycle system used in the car air conditioner has been exemplified, but the invention is not limited to the expansion valve 5. For example, the electric valve control device 11 and the electric valve device 12 according to the invention can be, of course, applied to any electric valve as long as the electric valve includes an inlet, an outlet, a valve body controlling a flow rate of a fluid flowing out of the outlet, and a motor driving the valve body.

Further, in the above-described embodiment, an example in which the invention is applied to the expansion valve of the refrigeration cycle has been described, but the invention can be applied to any electric valve driving a valve by a motor. Further, it is needless to say that the invention can be applied to a shut valve opening or closing a refrigerant passage or a switching valve (a three-way valve or a four-way valve) switching the refrigerant passage.

EXPLANATIONS OF LETTERS OR NUMERALS

5 expansion valve
8 stepping motor
9 electric valve
11 electric valve control device
11a regulator
11b microcomputer
11c EEPROM (nonvolatile storage unit)
11d stepping motor driver
12 electric valve device
14 signal transmitting and receiving line

The invention claimed is:

1. An electric valve control device controlling a valve opening degree of an electric valve by receiving power from an outside device, comprising:
a nonvolatile storage unit provided to store;
(a) valve opening degree information at the time of stopping an operation of the electric valve, and
(b) a number of times the valve opening degree information is stored in the nonvolatile storage unit,
after a power-off signal predicting a power-off operation of the electric valve or a sleep transition signal predicting a sleep mode transition operation is transmitted from the outside to the electric valve control device, and
wherein the electric valve control device is configured to transmit to the outside a power-off enable signal notifying a power-off enable state, or to transmit to the outside a sleep transition enable signal notifying a sleep mode transition enable state, when the nonvolatile storage unit stores said valve opening degree information and said number of times.

2. The electric valve control device according to claim 1, wherein the electric valve control device transmits a notification signal notifying a current state to the outside when the number of times of storing the valve opening degree information is equal to or larger than a predetermined number of times of storing the valve opening degree information.

3. The electric valve control device according to claim 1, wherein the electric valve control device resumes the control of the electric valve on the basis of the valve opening degree information stored in the nonvolatile storage unit when the power is input again or the sleep mode is cancelled.

4. The electric valve control device according to claim 1, wherein the electric valve control device receives the power-off signal, receives the sleep transition signal, transmits the power-off enable signal, and transmits the sleep transition enable signal by a LIN communication or a CAN communication.

5. An electric valve device obtained by integrally assembling the electric valve control device according to claim 1 and the electric valve.

6. An electric valve control device according to claim 1, wherein the nonvolatile storage unit stores the valve opening degree information of the electric valve before a power-off operation or a sleep mode transition operation of the electric valve.

* * * * *